Patented Dec. 20, 1949

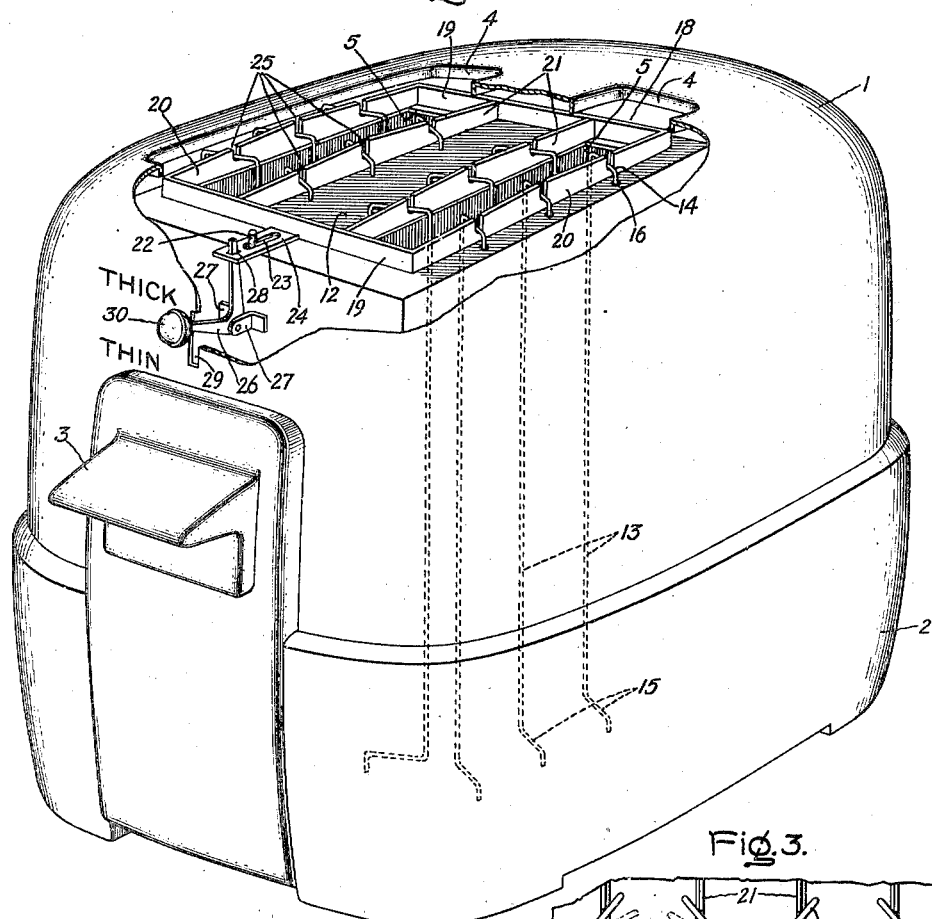
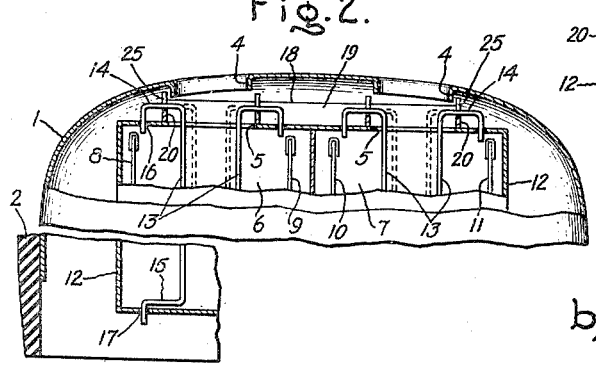
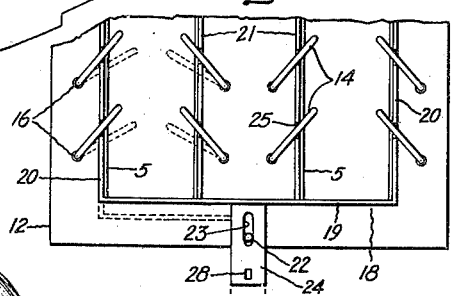
Inventors:
John H. Palmer,
Carl S. Dayton,
by Sheridan W. Briggs
Their Attorney.

2,491,829

UNITED STATES PATENT OFFICE 2,491,829

ADJUSTABLE SLICE GUIDE FOR TOASTERS

John H. Palmer, Milford, and Carl S. Dayton, Bridgeport, Conn., assignors to General Electric Company, a corporation of New York Application October 9, 1948, Serial No. 53,616

6 Claims. (Cl. 99—389)

Our invention relates to cooking or heating appliances commonly known as toasters, and more particularly to a means for positioning a slice of bread or other material properly within such toasters. This invention has particular usefulness as a guide for the slices, although obviously it could be used in any other desired way to position slices properly within the toaster.

Ordinarily, commercially sliced bread comes in thicknesses anywhere from $\frac{7}{16}$ of an inch to $\frac{1}{2}$ inch thick, but some special commercially sliced bread as well as some hand-sliced bread may come in slices thinner or thicker than this. A half of an English muffin may be $\frac{3}{4}$ of an inch thick. In most toasters on the market today of the type having an open slot into which the bread to be toasted is dropped, no provision is made to take care of these varying thicknesses of slices and consequently uneven browning of the toast takes place because some part of the slices may be closer to the heating elements than other parts of the slices. This disadvantage is emphasized when thin slices are being toasted because these thin slices tend to bend or buckle while toasting.

Our invention is designed to make it possible to toast evenly slices of varying degrees of thickness. An object of our invention is to provide a positioner, guide, or support for the slices, which can be easily adjusted for slices of different thickness. A further object is to provide a slice positioner which is compact, inexpensive, and readily applicable to toasters of known design.

The above objects, and others, are obtained through the provision of a movable rack controlling a series of bread positioning rods which are located opposite the heating surfaces of the toaster. Although we will show and describe one example of our invention as applied to a toaster of the type generally regarded as "automatic," obviously the invention could be used with "non-automatic" toasters.

Other objects and the details of that which we believe to be novel and our invention will be clear from the following description and claims taken with the accompanying drawing in which is illustrated an example of toaster embodying the present invention and incorporating our novel slice positioner.

In the drawing, Fig. 1 is a perspective view of one form of toaster of known design, showing how our invention may be applied thereto, parts of the figure being broken away for clarity; Fig. 2 is a fragmentary sectional view of the toaster showing our invention; and Fig. 3 is a fragmentary plan view of a toaster frame with our invention applied thereto.

The toaster shown in the drawing has an outer shell or casing 1 and may be provided with a base 2 and handles such as 3 (only one shown). In the top of the casing and inside the toaster are bread slots 4 and 5 which lead to the interior oven compartment or compartments 6 and 7. On either side of the bread slots 5 in the heating compartments are mounted the usual substantially flat or planar heating elements 8, 9, 10 and 11, which are fixed with respect to the inner frame 12 of the toaster. This inner frame is suitably secured within the toaster casing in the usual fashion. A bread carriage or carrier (not shown) may be manually or mechanically raised or lowered and will support the bottom edges of slices inserted through the bread slots 4 and 5. Thus far the description includes only known parts of conventional toasters.

In order to guide bread or other slices into the toaster and properly to position them with respect to the heating elements we provide a series or set of guide wires or rods 13 opposite the heating elements. Instead of being fixed within the toaster as is customary, these guides are movably mounted in the toaster, for instance, by pivoting them with respect to the toaster frame. For this purpose we provide angularly extending ends such as the crank arms 14 and 15 on the top and bottom respectively of each of the guide wires. The ends of these crank arms are pivoted in the top and bottom of the frame in holes 16 and 17 provided for this purpose. Each of the guide wires is, therefore, free to pivot or rotate about a vertical axis which is parallel to the plane of the adjacent toaster heater.

In order to limit the arc through which the guide wires will swing, as well as to control the movement of all of the wires simultaneously, we provide a movable control member such as the sliding rack 18. This rack is shown as of open rectangular form with ends 19 and sides 20. Because we have illustrated a two-slice toaster, we have shown additional interior pieces 21 extending parallel to but spaced from the sides 20.

This rack rests upon and is slidable with respect to the top of the frame 12, and is limited and guided in its sliding movement in any suitable fashion as by pins 22 (only one shown), located on the top of the toaster frame at either end of the rack, these pins riding in slots 23 formed in tabs or ears 24 which are secured to the ends of the rack. The length of the slots 23 will determine the range of movement of the rack with respect to the pins 22 and therefore with respect to the toaster frame.

In order to control the movement of all of the guide wires simultaneously by movement of the rack we provide bearing connection between the rack and the angularly extending ends of the guide wires. These connections are shown in the form of notches 25 in the sides 20 and in the cross pieces 21 of the rack. Each of the upper crank arms 14 passes through and is loosely seated in one of these notches. Therefore, movement of the rack will move all of the guide wires simultaneously and similarly. Movement of the rack is controlled in any suitable fashion. We prefer to use a bell crank 26 which may be pivotally mounted on a pair of lugs 27 secured to the toaster frame. One end of this bell crank extends loosely through an opening 28 in one of the guiding ears 24 and the other end of the bell crank is extended through a slot 29 in the outer casing 1 and carries a control knob or handle 30. Opposite the top and bottom ends of the slot 29 are provided suitable indicia for showing the position which the guide wires take.

In Figs. 2 and 3 we have indicated in dotted lines the extremes of position between which the guide wires are moved. We have found that a variation of distance between individual opposed pairs of guide wires from about ¾ inch to about ¼ inch is satisfactory for most toasting operations. Movement of the rack is therefore designed to give movement of the guide wires within the desired limits, each guide swinging through a similar arc and remaining parallel to the heating element opposite.

In operation of a toaster provided with our invention, the toast is inserted and the knob 30 is moved to adjust the guide wires to the thickness of the slices being toasted. The moving bread guides center the slice between the heating elements and support the slice well enough to allow no room for buckling. Therefore, both sides of either a thick or a thin slice will be toasted evenly.

The friction of the rack resting on the frame holds the frame and therefore the guides in adjusted position. Obviously, friction could be added if desired by providing suitable friction bearings for the rack or for the guides or for the mechanism which moves the rack.

It should also be obvious that although we have shown the invention as applied to a two-slice toaster, it could be used with a toaster for any other number of slices. Furthermore, although we have shown guide wires for both of the slices, these movable slice positioning elements could be provided opposite one side of a slice only. Such a construction would be useful in preventing buckling of thin slices, or in pressing the slice against a stationary positioner, guide, or similar element.

As will be evident from the foregoing description, certain aspects of our invention are not limited to the particular details of construction of the example illustrated, and we contemplate that various and other modifications and applications of the invention will occur to those skilled in the art. It is, therefore, our intention that the appended claims shall cover such modifications and applications as do not depart from the true spirit and scope of our invention.

What we claim as new and desire to secure by Letters Patent of the United States is:

1. In a toaster having a frame and a substantially planar heating element fixedly carried with respect to the frame, a slice positioner comprising a series of slice guide rods, angularly extending ends on said rods, the ends being pivotally mounted with respect to said frame on axes parallel to the plane of said heating element, a rack movably mounted with respect to said frame, bearing connections between said rack and the ends of the guide rods, and means for moving said rack, whereby said guide rods may be simultaneously rotated to swing in similar arcs with respect to said heating element.

2. In a toaster having a frame and a substantially flat heating element fixed in the frame, a slice positioner comprising a series of slice guides, angularly extending ends on said guides, the ends being pivotally mounted in said frame on axes parallel to the plane of said heating element, a rack slidably mounted on the frame, bearing connections between said rack and the ends of the slice guides, and a handle for sliding said rack.

3. In a toaster having a frame and a vertical planar heating element carried in the frame, a slice positioner comprising a series of vertically extending slice guides, horizontal angularly extending ends on said guides, the ends being pivotally mounted on said frame on axes parallel to the plane of said heating element, a rack slidably mounted on said frame, bearing connections between said rack and the ends of the slice guides, means for both guiding and limiting the extent of movement of said rack, and means for sliding said rack, whereby said slice guides may be simultaneously rotated to swing in similar limited arcs.

4. In a toaster having a frame and a vertical planar heating element carried in the frame, a slice positioner comprising a series of vertically extending slice guides, horizontal angularly extending ends on said guides, the ends being pivotally mounted in said frame on axes parallel to the plane of said heating element, a rack slidably mounted on said frame, said rack having notches therein in which the ends of the slice guides are loosely seated, and a handle for sliding said rack, whereby said guides may be simultaneously rotated to swing with respect to said heating element.

5. In a toaster having a frame and a vertical planar heating element carried in the frame, a slice positioner comprising a series of vertically extending slice guide rods, crank arm ends on said guide rods, the ends being pivotally mounted in said frame on axes parallel to the plane of said heating element, a rectangular rack slidably mounted on said frame, said rack having notches in one of its sides in which the crank arm ends are loosely seated, a bell crank pivoted to the frame, one end of the ball crank operatively engaging a side of said rack normal to the notched side, and a handle on the other end of said bell crank for moving said bell crank and said rack, whereby said guide rods may be simultaneously rotated.

6. In a toaster having a frame with a toasting slot therein and opposed heating elements on both sides of the slot, an adjustable slice guiding and centering mechanism comprising a set of similar opposed guide wires on each side of the slot between the heating elements, crank arm ends on the wires pivoted in the frame on either side of the slot, a rack slidably mounted on the frame, bearing connections between said rack and the crank arm ends on the guide wires, and means for moving said rack, whereby both opposed sets of guide wires may be rotated simultaneously centrally of said opposed heating elements to guide and center a slice inserted through the toasting slot.

JOHN H. PALMER.
CARL S. DAYTON.

REFERENCES CITED

The following references are of record in the file of this patent:

UNITED STATES PATENTS

| Number | Name | Date |
| --- | --- | --- |
| 1,903,324 | Codling | Apr. 4, 1933 |
| 2,355,153 | Gomersall | Aug. 8, 1944 |